United States Patent [19]
Cahill et al.

[11] Patent Number: 5,481,631
[45] Date of Patent: Jan. 2, 1996

[54] OPTICAL SWITCHING APPARATUS WITH RETROREFLECTOR

[75] Inventors: Jerry E. Cahill, Trumbull; David H. Tracy, Norwalk, both of Conn.

[73] Assignee: The Perkin-Elmer Corp., Norwalk, Conn.

[21] Appl. No.: 201,848

[22] Filed: Feb. 25, 1994

[51] Int. Cl.$^6$ .................................................. G02B 6/26
[52] U.S. Cl. .............................. 385/18; 385/25; 385/36
[58] Field of Search .............................. 385/15–23, 25, 385/26, 31, 33, 34, 35, 36

[56] References Cited

U.S. PATENT DOCUMENTS

| | | | |
|---|---|---|---|
| 4,569,569 | 2/1986 | Stewart | 350/96.19 |
| 4,589,726 | 5/1986 | Bohrer | 350/96.2 |
| 4,626,065 | 12/1986 | Mori | 350/96.15 |
| 4,848,871 | 7/1989 | Seidel et al. | 350/96.29 |
| 4,989,932 | 2/1991 | Landa et al. | 350/96.1 |
| 5,005,934 | 4/1991 | Curtiss | 350/96.15 |
| 5,056,886 | 10/1991 | Hoult | 385/20 |
| 5,173,958 | 12/1992 | Folsom et al. | 385/536 |

FOREIGN PATENT DOCUMENTS

| | | | |
|---|---|---|---|
| 0016593 | 10/1980 | European Pat. Off. | |
| 55-014230 | 4/1980 | Japan | |
| 55-84903 | 6/1980 | Japan | 385/18 |
| 57-195202 | 11/1982 | Japan | 385/18 |
| 61-232412 | 10/1986 | Japan | 385/18 |
| 2099175 | 12/1982 | United Kingdom | |

*Primary Examiner*—Rodney B. Bovernick
*Assistant Examiner*—John Ngo
*Attorney, Agent, or Firm*—Edwin T. Grimes; Herbert S. Ingham

[57] ABSTRACT

An optical switch includes a primary optical fiber terminating in a primary window, and a plurality of secondary optical fibers each terminating in a secondary window facing in the same direction as and spaced laterally from the primary window. A primary lens on a primary axis has a focal point positioned on the axis at the central window. Each of a plurality of secondary lenses has an axis and a focal point positioned on such axis at a secondary window. The secondary axes are parallel to and equidistant from the primary axis. A retroreflector is spaced from the lenses oppositely from each window and has an optical axis centered parallel to the primary axis midway between the primary axis and any of the secondary fibers. A stepper motor rotates the retroreflector about the primary axis to each of a plurality of selected positions to provide optical switching for light transmission between the primary fiber and any selected secondary fiber.

2 Claims, 1 Drawing Sheet

OPTICAL SWITCHING APPARATUS WITH RETROREFLECTOR

This invention relates generally to optical switching of light transmission, and particularly to optical switching for optical fibers such as for photometric instruments.

BACKGROUND OF THE INVENTION

Developments in the use and versatility of photometric instruments, as well as other optical apparatus such as for transmission of information, have expanded a need for switching in optical transmission. An example is switching for a spectrophotometer.

Switching devices generally contain at least one movable optical element with a position or orientation that is changed to switch from one configuration to another. An important requirement of switching devices used in spectrophotometric applications is insensitivity of the light throughput to small, unavoidable motions or jiggling that result in changes in the relative positions or orientations of optical elements. Any change in throughput while the switch is at one setting will cause an incorrect change in a measured photometric value. Such change in throughput upon switching away from and then back to a given setting will result in a lack of reproducibility in the measured photometric value.

Recently optical fibers have been adapted to carry radiation to and from a light transmitting sample probe remote from the instrument. The probe may be immersed in the liquid as described, for example, in U.S. Pat. No. 5,077,481 (Hoult), to monitor for any ongoing changes in the liquid. It sometimes is desirable to monitor several samples with the same photometric instrument, in which case switching is needed for selecting samples or probes. Several types of optical switches have been known. For example, U.S. Pat. No. 5,056,886 (Hoult) discloses the use of a concave mirror for switching between fibers arranged in a bundle, the mirror being rotated about a rotation axis spaced from the optical axis to effect switching. This switch requires accurate alignment to maintain and reproduce light throughput.

Rotatable periscopes for switching are taught in U.S. Pat. Nos. 4,626,065 (Mori) and 5,005,934 (Curtiss). With periscopes, output radiation generally is continued in the same direction as the input radiation, but laterally offset. In principle, the light throughput of these are relatively insensitive to small changes in the position of the periscope alignment, but have some sensitivity to rotational changes. Also, a central motor for switching requires space that adds optical path length to the system, thereby increasing the sensitivity to rotational changes. U.S. Pat. No. 4,989,932 (Landa et al) discloses a multiplexer comprising a rotatable barrel containing a pair of 45° mirrors to deflect light passage to, and return light from, a selected pair of optical fibers. This system is more sensitive than the periscope to changes in both position and orientation of the moving optical elements.

A Porro reflector is similar to a periscope except that the two component reflectors are oriented to direct the output light back toward the input source. Porro reflectors are particularly sensitive to small changes in rotational position about an axis perpendicular to both the edge of the Porro reflector and the light beams.

Retroreflectors, particularly corner cube reflectors, are used in optics to redirect light back toward the originating direction. For example U.S. Pat. No. 4,569,569 (Stewart) discloses a coupler for an optical fiber system. With a single lens for transmitting light both to and from a retroreflector, light is passed between optical fibers. One embodiment includes a beam splitter whereby the retroreflector may be rotated to select pairs of outgoing fibers for transmitting a split beam (FIGS. 7 and 8 of the patent).

SUMMARY OF THE INVENTION

An object is to provide a novel optical switching apparatus for the transmission of light, particularly between optical fibers. A further object is to provide such apparatus for coupling and decoupling the transmission of light. Another object is to provide such apparatus for switching light transmission between one light transmitter and any selected one of a plurality of other light transmitters. Another object is to provide such an apparatus which is relatively insensitive to small motions of the movable optical elements, particularly rotational motions. Yet another object is to provide improved optical switching between a photometric instrument and selected external samples through the use of optical fibers.

The foregoing and other objects are achieved, at least in part, with an optical switching apparatus associated with transmission means such as optical fibers for transmitting radiation. Such means include a primary transmission means terminating in a primary window facing in a predetermined direction along a primary axis, and a secondary transmission means terminating in a secondary window facing in the predetermined direction along a secondary axis. The secondary axis is parallel to and laterally spaced from the primary axis.

A pair of lenses is communicative of light radiation with the transmission means, consisting of a primary lens and a secondary lens. The primary lens has an axis coinciding with the primary axis and a focal point positioned on the primary axis at the primary window. The secondary lens has an axis coinciding with the secondary axis and a secondary focal point positioned on the secondary axis at the secondary window. A retroreflector, preferably a corner cube reflector, i.e., prism or reflecting mirrors, is spaced from the lenses oppositely from each window. The retroreflector has its optical axis aligned parallel to the primary axis.

A positioning means selectively positions the retroreflector to each of a plurality of selected positions, advantageously by a stepper motor rotating the retroreflector about the primary axis to each of the plurality of selected positions. In a transmitting position, the optical axis of the retroreflector is aligned midway between the primary axis and the secondary axis in a plane thereof, such that radiation can be transmitted between the primary transmission means and the secondary transmission means by the retroreflector via the lenses. In a second position, the optical axis is displaced away from the plane so that substantially no radiation can pass between the central transmission means and the outer transmission means. Thus, in one aspect of the invention, on-off switching is provided between the two transmission means.

In a preferred aspect, the transmission means comprises at least one additional secondary transmission means for transmitting radiation. Each additional secondary means terminates in an associated window facing in the predetermined direction along an associated axis parallel to the primary axis. Each associated axis has a lateral spacing from the primary axis radially equal to the lateral spacing of the secondary axis from the primary axis. The associated axes and the secondary axis are arranged arcuately about the primary axis.

Associated with each additional transmission means is an additional lens having an axis coinciding with the associated axis and a focal point positioned on the associated axis at the associated window. The plurality of selected positions of the retroreflector includes, for each additional transmission means, an additional transmitting position with the optical axis positioned midway between the primary axis and the associated axis in a plane thereof. Thus radiation can be transmitted between the primary transmission means and the additional transmission means by the retroreflector via the primary lens and the additional lens. Selected rotation of the retroreflector about the primary axis provides switching for transmission of radiation between the central transmission means and any selected secondary transmission means.

Selected optical elements are advantageously misaligned so as to reduce sensitivity of the radiation transmission to alignment during switching. For example, the primary lens may have a nominally different focal length than the secondary lenses.

DETAILED DESCRIPTION OF THE INVENTION

Figure 1:
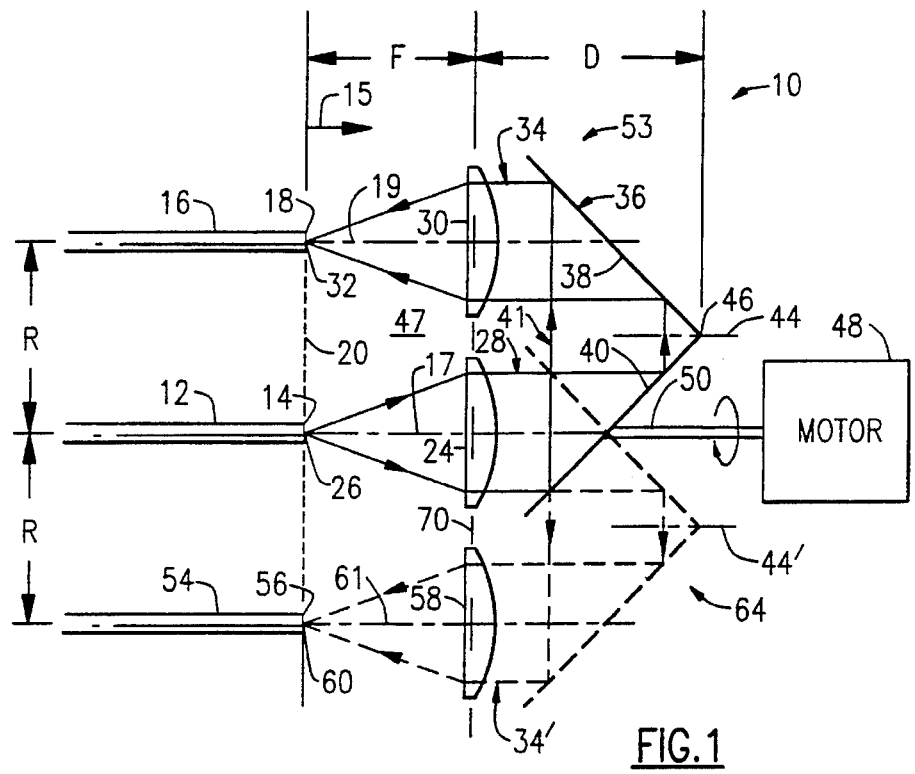
FIG. 1 is a schematic drawing of an optical apparatus of the invention.

With reference to an optical apparatus 10 of FIG. 1, a primary optical fiber 12 transmits light from a source (not shown) of light radiation that may be visible, infrared or ultraviolet. The fiber terminates in a primary end window 14 facing in a predetermined direction 15 which is toward the right in the figure. At its termination, the primary optical fiber is collinear with a primary axis 17. A secondary, outer optical fiber 16 terminates in an outer end window 18 facing in the same predetermined direction. At its termination, the outer optical fiber is collinear with a secondary axis 19 which is parallel to and spaced laterally from the primary axis by a distance R. The windows 14,18 preferably lie in a common plane 20 normal to the primary axis.

A primary lens 24 is disposed with its optical axis coincident with the primary axis 17 and with its focal point 26 located on the primary axis at the window 14. Divergent light from the window is refracted by the primary lens to form a collimated beam of light 28 extending from the primary lens on the opposite side of the lens from the window. A similar, preferably identical or nearly identical, secondary lens 30 is disposed with its optical axis coincident with the secondary axis 19 and with its focal point 32 located on the secondary axis at the window 18. This lens focuses a collimated light beam 34 onto the end window 18. In the present embodiment the primary lens 24 and the secondary lens 30 have substantially equal focal lengths. (The term "lens" as used herein and in the claims means a single lens or a combination of lenses having the same function.)

A retroreflector 36 reflects light between the lenses. The retroreflector is shown schematically as a pair of mirrors 38,40, but is actually a corner cube prism or equivalent configuration of mirrors having three orthogonal reflecting surfaces. Other similarly functioning arrangements for a retroreflector may be utilized, for example a "cats eye" with a suitable arrangement of a higher number of reflecting facets.

The retroreflector is situated with respect to the lenses 24,30 oppositely from the windows 14,18. In a transmission position, the retroreflector reflects the ingoing collimated beam 28 into the outgoing collimated beam 34 via an intermediate beam 41 (which is actually a double beam between the three reflectors of the corner cube retroreflector, an intermediate reflection not being shown). This is achieved by positioning the retroreflector so that its axis 44 through the vertex 46 is parallel to the primary axis 17 and is centered midway between the primary and secondary axes 17,19 in the transmission plane defined by these axes.

Orientation of the retroreflector about its axis 44 is theoretically not critical. However, it is prudent to orient so that there is no reflection at a corner between cube face.

A stepper motor 48 or other suitable positioning means is connected to the retroreflector 36 with a drive shaft 50 to selectively rotate the retroreflector about the primary axis 17. The retroreflector is configured cooperatively with the primary lens 24 and the secondary lens 30 so that the primary focus 26 and the secondary focus 32 constitute conjugate foci with each other. Thus light transmitted in by the primary fiber 12 is passed through the retroreflector 36 and out through the secondary fiber 16. If the fibers and lenses are precisely the same, and properly aligned, the light beam characteristics will be unchanged from fiber to fiber. It also is equivalent in this invention whether the light is transmitted from the central fiber to the outer fiber, or vice versa.

The stepper motor 48, or other positioning means such as a hand control on the axle 50, is used to selectively rotate the retroreflector 36 about the primary axis 17 to each of a plurality of selected positions. For a simple on-off optical switch there are two positions. In the first position 53, with the retroreflector axis 44 positioned between the primary and secondary axes 17,19 in the transmission plane, light can pass between the central fiber 12 and the outer fiber 16. In a second position, e.g., a position 64 (shown with broken lines) 180° from the first position, the retroreflector is rotated sufficiently for its axis to be displaced away from alignment with the primary and secondary axes for no light to pass between the central transmission means 12 and the outer transmission means 16. In this aspect, the two fibers simply are coupled and decoupled with an on-off switch. A much smaller rotation than 180° clearly would be sufficient for this purpose. In a broader purview of an on-off switch, the positioning means may displace the retroreflector laterally; however the rotational means of the present example is particularly convenient.

In a further aspect of the invention, included in FIG. 1, there is at least one additional secondary fiber 54, or other transmission means for transmitting light, one such fiber being shown. Each such fiber terminates in an associated end window 56 which preferably lies in the common plane 20. At its termination the outer optical fiber is collinear with an associated axis 61 which is parallel to and spaced laterally from the primary axis 17 by the distance R, i.e., the same spacing as the first secondary axis 19. There may be as many additional fibers as needed and as space allows.

A separate lens 58 is associated with each additional fiber. Each such lens is disposed with an associated focal point 60 located on the associated lens axis 61 at the associated end window 56. Generally the configuration for each additional fiber and lens is the same as for the first secondary fiber 16 and its lens 30. Focal lengths of all secondary lenses should be equal to each other and, in one embodiment, are the same as the focal length of the primary lens. All secondary fibers and lenses are arranged on their respective axes arcuately about the primary axis 17.

The plurality of selected positions of the retroreflector further includes, for each additional fiber, an additional position 64 with the collimated beam path in a new position 34'. The new axis of the retroreflector is aligned in a new position 44' centered midway between the primary and additional axes 17,61 in the transmission plane of these axes, so that light can pass between the primary fiber 12 and the additional fiber 54. Switching is thereby provided for light to be passed between the primary fiber and any selected secondary fiber.

All of the windows 14,18,56 preferably lie in the common plane 20 normal to the central axis. Ideally the retroreflector should be disposed so that the sum of the lateral spacings R of the axes and the axial distance D of the vertex from the effective plane 70 of the lenses is equal to the sum of the focal lengths F of the primary lens and secondary lens (shown equal in this embodiment); thus R+D=2F. This ensures that all rays from one fiber will be within the numerical aperture of its partner. However, this ideal is not critical, and the foregoing relationship may be deviated by a factor of two or more.

The fibers should be substantially identical, and the ends of the fibers may be one-on-one imaged on each other. Precise alignment of all components allows for maximum light throughput without an increase in the etendue of the system.

However, the stability and repeatability can be enhanced by selectively and nominally misaligning the optics. This will reduce light transmission slightly, but make it more reproducible and stable. One way to misalign is to provide the primary lens 24 with a nominally different focal length than that of the secondary lenses. For this purpose, the focal length difference should be between about 10% and 20% of the central lens focal length. If, for example, the focal length of the primary lens is greater than those of the secondary lenses, the image of the end of the primary fiber on the end of the secondary fiber will be demagnified, while the angles of the rays coming from the primary fiber will spread beyond the numerical aperture of the secondary fiber.

Another means for misalignment is through displacement of optical elements from the ideal positions set forth above. For example, displacing the retroreflector along the axis 17 away from the lens plane so as to approximately double the distance D. This will cause an angular misalignment relative to the numerical aperture of the fibers. Yet another way to misalign an image of the end of one fiber or the other is to change the distance between the primary fiber and its lens by about 5% to 10% of the focal length of the lens.

Figure 2:
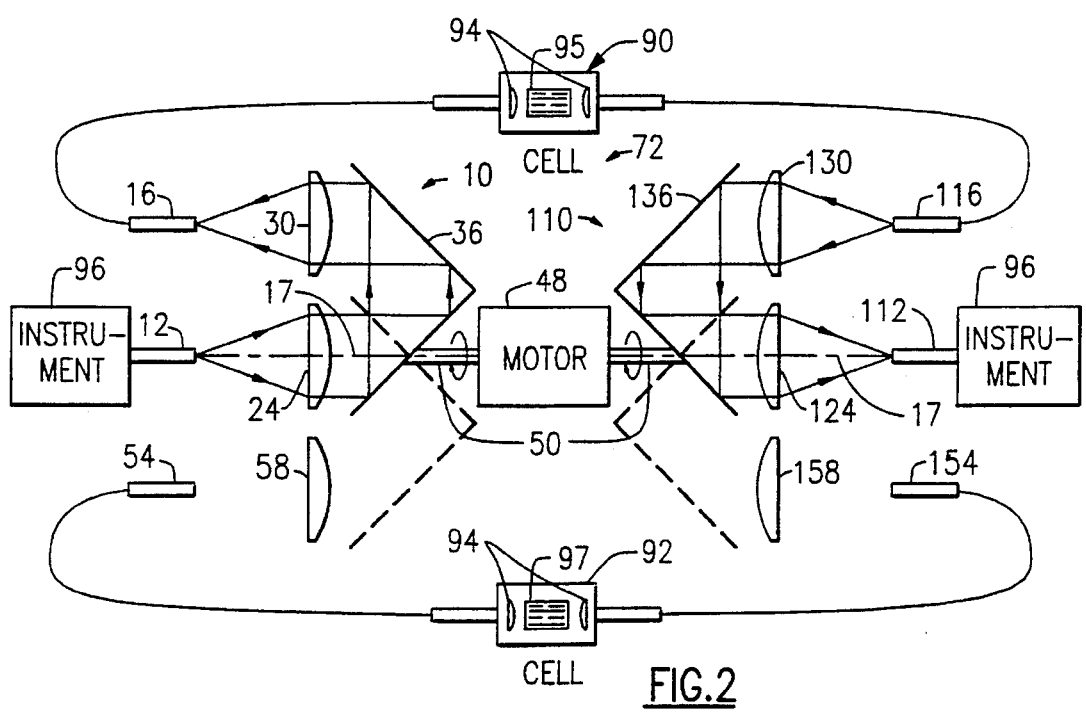
FIG. 2 is a schematic drawing of another embodiment of an apparatus of the invention.

The foregoing switching apparatus may be utilized for selection of fiber pairs for conveying light between remote test samples and a photometric instrument such as a spectrophotometer. This may be achieved in a combined apparatus 72 (FIG. 2) with a second combination of switching optics 74 substantially identical to the first combination 10 except arranged in mirror image thereof and facing oppositely therefrom. The second, counterpart combination 110 includes a counterpart primary optical fiber 112 (or other transmission means for transmitting light), a counterpart secondary fiber 116, at least one counterpart additional fiber 154, and a counterpart retroreflector 136. Respective counterpart lenses 124, 130, 158 also are provided.

The counterpart primary fiber 112 is aligned axially with the primary fiber 12 on the axis 17 of the primary optical combination 10. The same stepper motor 48 (or other positioning means, such as a second motor) is connected with a common drive shaft 50 (or pair of aligned drive shafts) to rotate the second retroreflector 136 about the primary axis 17 mutually with the first retroreflector 36. The second secondary fiber 116 and each second additional fiber 154 has an optical pairing externally with a matching outer fiber 16 or additional fiber 54 of the first combination so as to effect light transmittal through each pairing. The optical pairing is effected, for example, by way of liquid sample cells 90,92 with a plurality of lenses 94 arranged conventionally for passing light through the liquid 95,97 for analysis. Each fiber pair is utilized with a different sample cell.

Selective, mutual rotation of the retroreflectors provides switching for light to be passed out of and back to an instrument 96 via the second primary fiber 76 and the primary fiber 12 of the first combination, and further via a selected pair of outer fibers, thereby selecting sample cells.

Although the examples herein are presented with respect to optical fibers, other light transmission means may be utilized. For example, a central transmission means may be an optical train of lenses and/or mirrors may image a light source at the position of the windows. Similarly, another optical train may pick up an image at the location of the outer window. In such cases the term "windows" as used herein and in the claims may mean a virtual window at the location of such an image. A physical aperture stop may be positioned at the window location.

Also, it will be appreciated that the invention may be utilized with optical systems other than photometric instruments. An example is information transmittal such as telephone or computer lines.

Use of a retroreflector according to the invention has advantages over other switching means. The present inventors have ascertained that a corner cube reflector provides a significant reduction in light-passage sensitivity over single plane mirror arrangements with respect to small rotational displacements. The corner cube reflector also provides significant reductions in light-passage sensitivity over the concave mirror arrangements of the aforementioned U.S. Pat. No. 5,077,481 with respect to both small rotational and translational displacements. An advantage over the periscope switching method is that, in practice, the latter requires a motor inside the circle of the outer fibers, thereby increasing the length of the transverse distance travelled by the beam, decreasing stability and repeatability. Although the periscope and Porro reflector have low sensitivity to translational displacements, they are more sensitive than a corner cube to rotational error. The corner cube also provides improvements in sensitivity over single mirror switching. Multiple lenses arranged as taught herein provide for improve sensitivity over the single lens system of the aforementioned U.S. Pat. No. 4,569,569.

The single lens arrangement of the aforementioned U.S. Pat. No. 4,569,569 splits the beam from a retroreflector, thereby allowing only half of the light to be transmitted to any single selected fiber. In the optical apparatus of the present invention, the use of a separate dedicated lens for each fiber does not split the beam, and so allows substantially the full amount of light to be passed along.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

We claim:

1. An optical switching apparatus which comprises a first combination of optics comprising: transmission means for transmitting radiation, comprising primary transmission means terminating in a primary window facing in a predetermined direction along a primary axis, and secondary transmission means terminating in a secondary window facing in the predetermined direction along a secondary axis, the secondary axis being parallel to and having a lateral spacing from the primary axis;

- a pair of lenses communicative of radiation with the transmission means, consisting of a primary lens and a secondary lens, the primary lens having an axis coinciding with the primary axis and a focal point positioned on the primary axis at the primary window, and the secondary lens having an axis coinciding with the secondary axis and a secondary focal point positioned on the secondary axis at the secondary window;
- a retroreflector spaced from the lenses oppositely from each window, the retroreflector having an optical axis aligned parallel to the primary axis; and
- positioning means for selectively rotating the retroreflector about the primary axis to each of a plurality of selected positions including a transmitting position with the optical axis positioned midway between the primary axis and the secondary axis in a plane thereof, such that radiation can be transmitted between the primary transmission means and the secondary transmission means by the retroreflector via the lenses, and a further position with the optical axis displaced away from the plane such that substantially no radiation can pass between the primary transmission means and the secondary transmission means; wherein:
- the transmission means further comprises one or more additional secondary transmission means for transmitting radiation, each such additional means terminating in an associated window facing in the predetermined direction along an associated axis, each associated axis being parallel to and having a lateral spacing from the primary axis radially equal to the lateral spacing of the secondary axis from the primary axis, the secondary axis and the associated axes being arranged arcuately about the primary axis;
- the apparatus further comprises an additional secondary lens associated with each additional transmission means, each additional lens having an axis coinciding with the associated axis and a focal point positioned on the associated axis at the associated window, so that the plurality of selected positions of the retroreflector includes, for each additional transmission means, an additional transmitting position with the optical axis positioned midway between the primary axis and the associated axis in a plane thereof, such that radiation can be transmitted between the primary transmission means and the additional transmission means by the retroreflector via the primary lens and the additional lens, whereby selected rotation of the retroreflector about the primary axis provides switching for transmission of radiation between the primary transmission means and any selected secondary transmission means; and the apparatus further comprises a second combination of optics, the first combination and the second combination are arranged in mirror image and facing oppositely from each other, the second combination comprising a second retroreflector, second primary transmission means for transmitting radiation and a plurality of second secondary transmission means for transmitting radiation, the second primary transmission means being aligned axially with the primary transmission means of the first combination, each secondary transmission means of the second combination being aligned axially with a counterpart secondary transmission means of the first combination, and the positioning means being connected to rotate the second retroreflector about the primary axis whereby mutual rotation of the retroreflectors provides coordinated switching of the first combination and the second combination.

2. The apparatus of claim 1 wherein the positioning means comprises a stepper motor disposed between the second retroreflector and the retroreflector of the first combination, and a drive shaft extending from opposite sides of the motor, the drive shaft being connected to each retroreflector on the primary axis.

* * * * *